(No Model.)

B. C. WAITE.
PISTON PACKING.

No. 331,219. Patented Nov. 24, 1885.

WITNESSES:
F. McArdle
C. Sedgwick

INVENTOR:
B. C. Waite
BY Munn & Co.
ATTORNEYS.

UNITED STATES PATENT OFFICE.

BENJAMIN C. WAITE, OF BROOKLYN, NEW YORK.

PISTON-PACKING.

SPECIFICATION forming part of Letters Patent No. 331,219, dated November 24, 1885.

Application filed June 23, 1884. Serial No. 135,744. (No model.)

*To all whom it may concern:*

Be it known that I, BENJAMIN C. WAITE, of Brooklyn, in the county of Kings and State of New York, have invented certain new and useful Improvements in Piston-Packings, of which the following is a full, clear, and exact description.

This invention consists in providing a split packing-ring which is adapted to be expanded by a spiral spring with a bolt passing through lugs near the ends of the packing-ring, arranging said bolt so that the diameter of said ring can be reduced thereby when necessary, as will be hereinafter set forth and claimed.

Reference is to be had to the accompanying drawings, forming a part of this specification, in which similar letters of reference indicate corresponding parts in both the figures.

Figure 1:
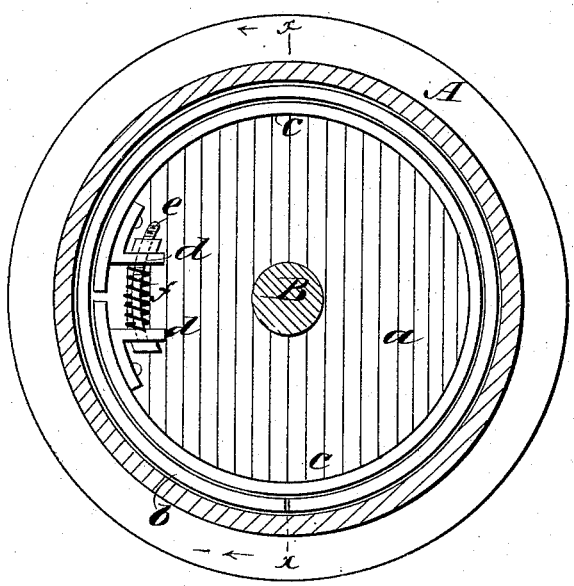
Figure 2:
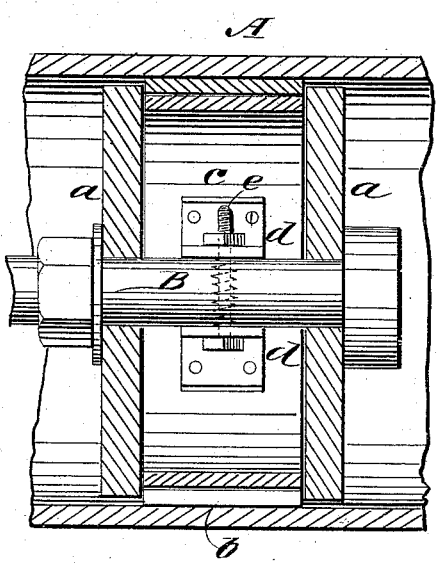

Figure 1 is a cross-section of a cylinder and piston with the improved packings, and Fig. 2 is a section at right angles to Fig. 1.

A is the cylinder; B, the piston-rod, provided with heads *a a*, between which are the split rings *b c*, one within the other. The inner ring, *c*, is provided with lugs *d d* at the inner side, and adjacent to the opening in the ring, and the two lugs are connected by a bolt, *e*, passing through them. The bolt has a nut, by which the ends of the split ring can be drawn together against the tension of the spiral spring *f*, held on the bolt *e* between the lugs, for the purposes of expanding the ring. When the ring *c* is to be inserted in the outer ring, it is contracted by means of the bolt and nut, and the nut afterward loosened to allow spring *f* to expand the packing.

When it is necessary to remove the ring from the piston-head, the ring can be contracted by means of the bolt. With this improvement the assembling and repairing of piston-heads are very much facilitated.

I am aware that it is not new to use spiral springs in connection with packing-rings for pistons for the purpose of expanding said rings, and also that bolts have been used for increasing the tension of the springs of piston-packings, and to springs and bolts for these purposes I do not lay any claim.

Having thus described my invention, I claim as new and desire to secure by Letters Patent—

In piston-packings, the combination, with a split packing-ring, apertured lugs *d*, secured thereto near its ends, and with the spring *f*, located between said lugs *d*, of the bolt *e*, having its head and nut on the outsides, respectively, of the said lugs, as set forth.

BENJAMIN C. WAITE.

Witnesses:
GEO. D. WALKER,
C. SEDGWICK.